(12) United States Patent
Dick et al.

(10) Patent No.: US 6,447,000 B1
(45) Date of Patent: Sep. 10, 2002

(54) MECHANISM FOR RETRACTABLE GOOSENECK HITCH BALL

(75) Inventors: Bernard L. Dick; John G. Freeman, both of Chanute, KS (US)

(73) Assignee: PopUp Industries, Inc., Chanute, KS (US)

( * ) Notice: Subject to any disclaimer, the term of this patent is extended or adjusted under 35 U.S.C. 154(b) by 0 days.

(21) Appl. No.: 09/496,078

(22) Filed: Feb. 1, 2000

Related U.S. Application Data

(60) Provisional application No. 60/118,935, filed on Feb. 5, 1999.

(51) Int. Cl.[7] .................................................. B60D 1/06
(52) U.S. Cl. ...................... 280/511; 280/507; 280/491.5
(58) Field of Search ................................ 280/507, 511, 280/491.3, 491.5, 901

(56) References Cited

U.S. PATENT DOCUMENTS

| | | | | |
|---|---|---|---|---|
| 3,856,330 A | | 12/1974 | Baxter et al. ................ 230/433 |
| 4,256,324 A | * | 3/1981 | Hamilton ..................... 280/433 |
| 4,570,966 A | | 2/1986 | Giboney et al. ............. 230/433 |
| 4,657,274 A | | 4/1987 | Mann et al. .................. 230/433 |
| 5,016,898 A | | 5/1991 | Works et al. ................. 230/433 |
| 5,104,138 A | | 4/1992 | Allen ........................... 230/433 |
| 5,143,393 A | | 9/1992 | Meyer ......................... 230/491.1 |
| 5,242,186 A | * | 9/1993 | Pettersson ................... 280/511 |
| 5,344,172 A | | 9/1994 | Jaun ........................... 230/415.1 |
| 5,472,222 A | | 12/1995 | Marcy ......................... 230/433 |
| 5,577,751 A | | 11/1996 | Matthews ................... 230/433 |
| D377,001 S | | 12/1996 | Martin et al. ............... D12/161 |
| 5,678,839 A | | 10/1997 | Pobud, Jr. et al. ........ 230/491.5 |
| 5,738,363 A | | 4/1998 | Larkin ........................ 230/491.1 |
| 5,853,186 A | | 12/1998 | Gentner et al. ........... 230/491.1 |
| 5,860,671 A | | 1/1999 | Mackeown ................. 230/511 |
| 5,906,387 A | | 5/1999 | Wallace ..................... 280/491.3 |
| 5,964,475 A | * | 10/1999 | Gentner et al. ............. 280/420 |

\* cited by examiner

*Primary Examiner*—Avraham Lerner
*Assistant Examiner*—L. Lum
(74) *Attorney, Agent, or Firm*—Shook, Hardy & Bacon L.L.P.

(57) ABSTRACT

A retractable gooseneck trailer hitch mechanism for mounting in a bed in a pickup truck. The mechanism has a housing with a generally vertical opening therein which receives a hitch member. The housing has a generally vertical slot therein through which a portion of the hitch member extends outwardly therethrough. A cam having an arcuate face is pivotally coupled with the housing and is rotatable between a first and second position. A linkage assembly is coupled with the cam and permits a user of the mechanism to move the cam between its first and second positions from a location remote to the hitch member. When the cam is in its first position, the hitch member is in a lowered or retracted position. To move the hitch member to a raised or use position, the user rotates the cam from its first position to the second position via the linkage assembly. As the cam rotates from the first position to the second position, the arcuate edge pushes upwardly on the portion of the hitch member which extends outside the housing through the slot. The portion of the hitch member which extends through the slot rides along the arcuate edge and travels upwardly in the slot until the hitch member is in the extended or use position.

29 Claims, 7 Drawing Sheets

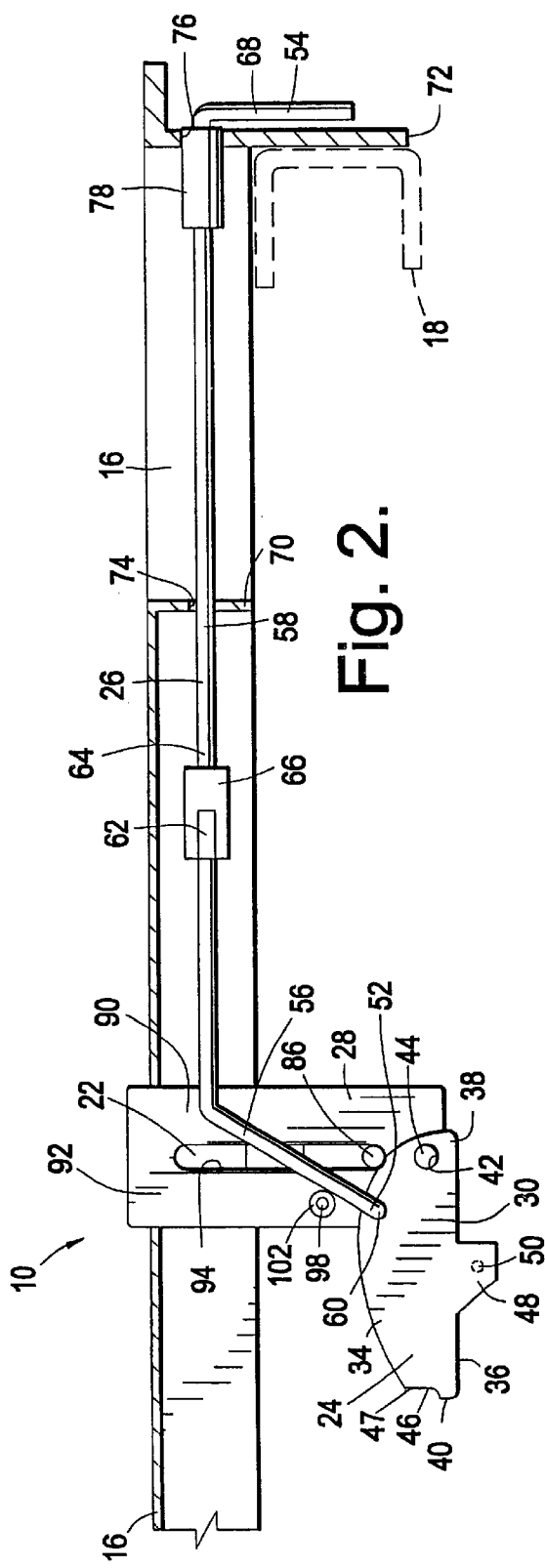
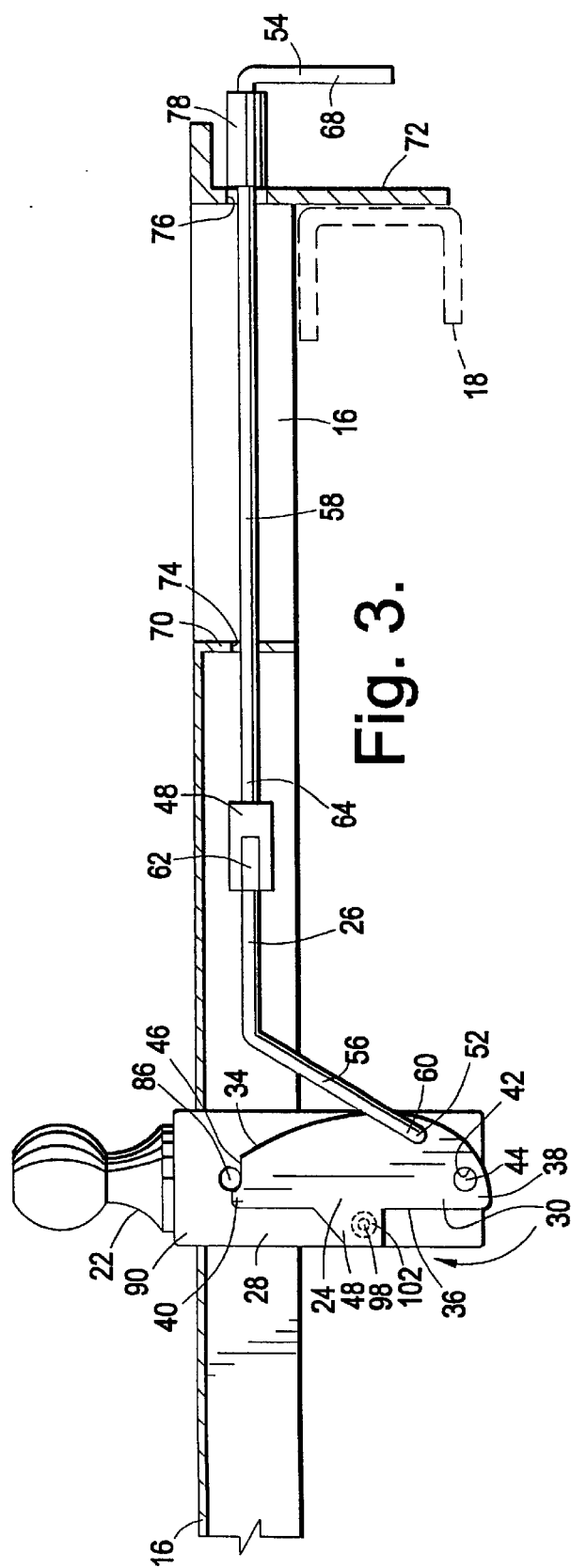

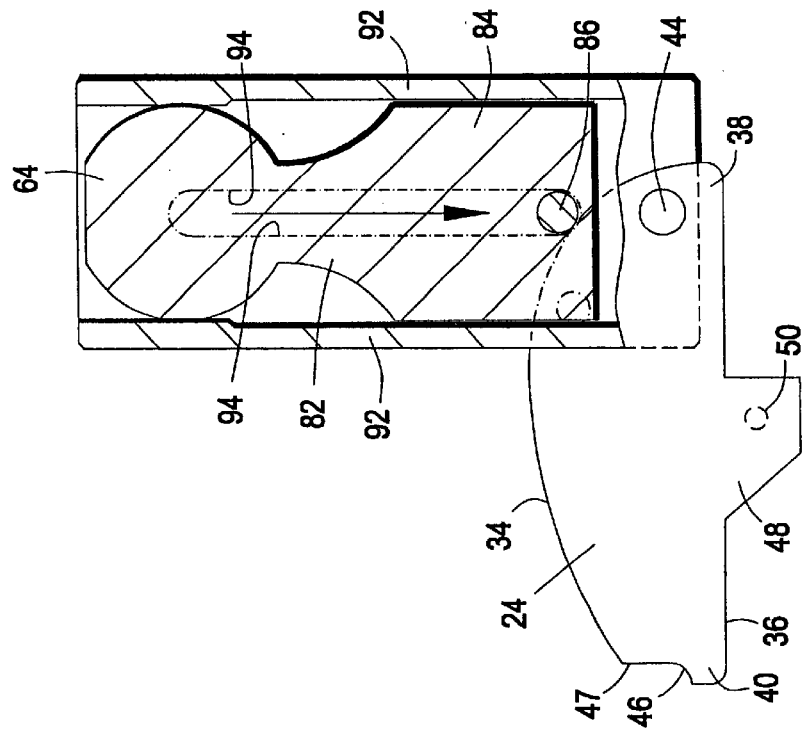
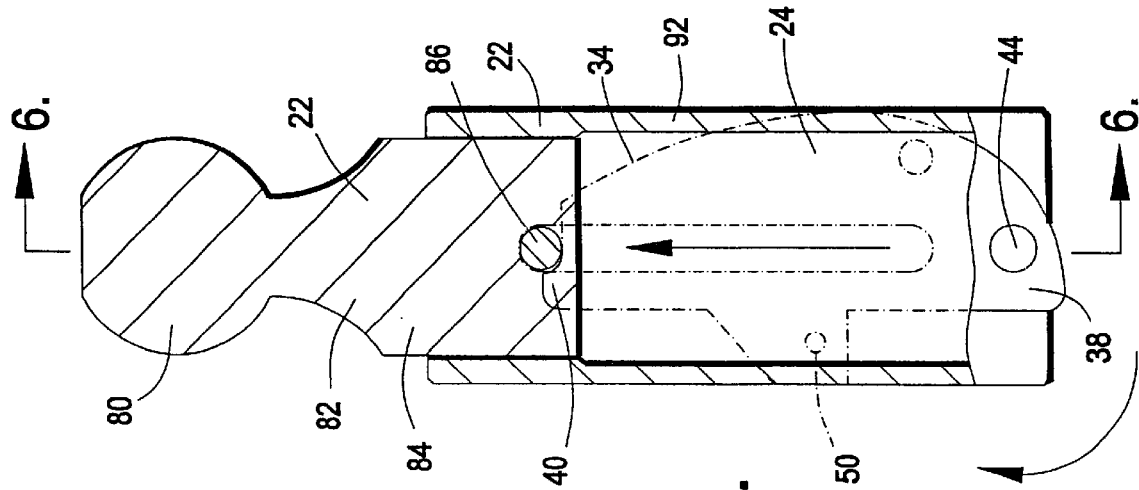
Fig. 5.
Fig. 4.

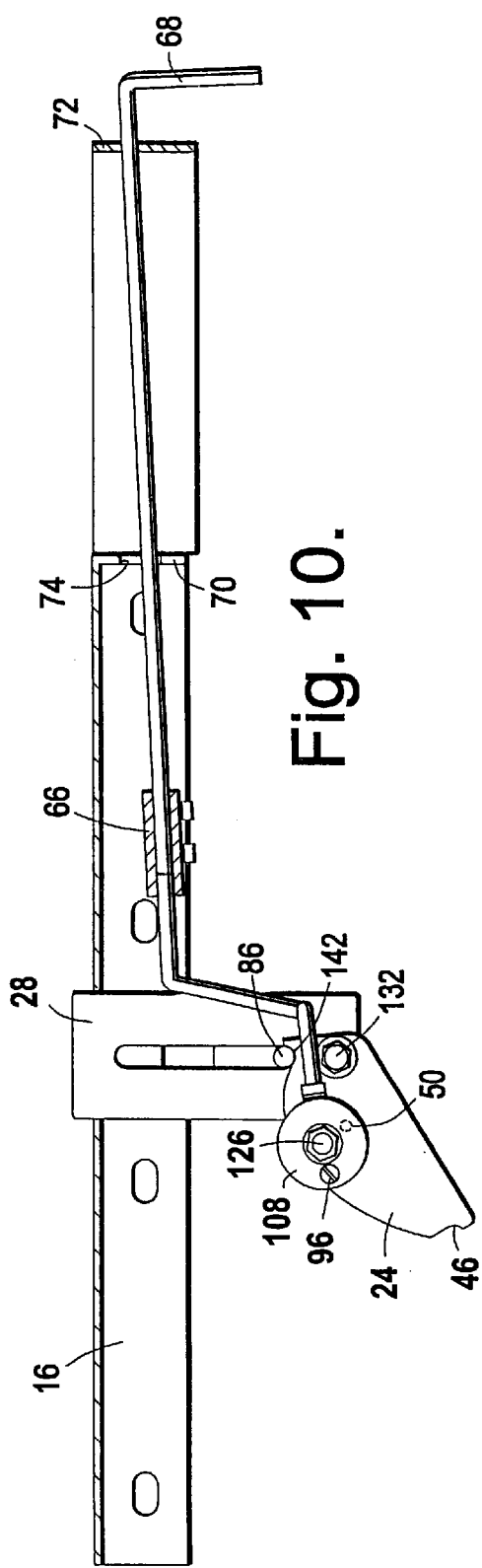
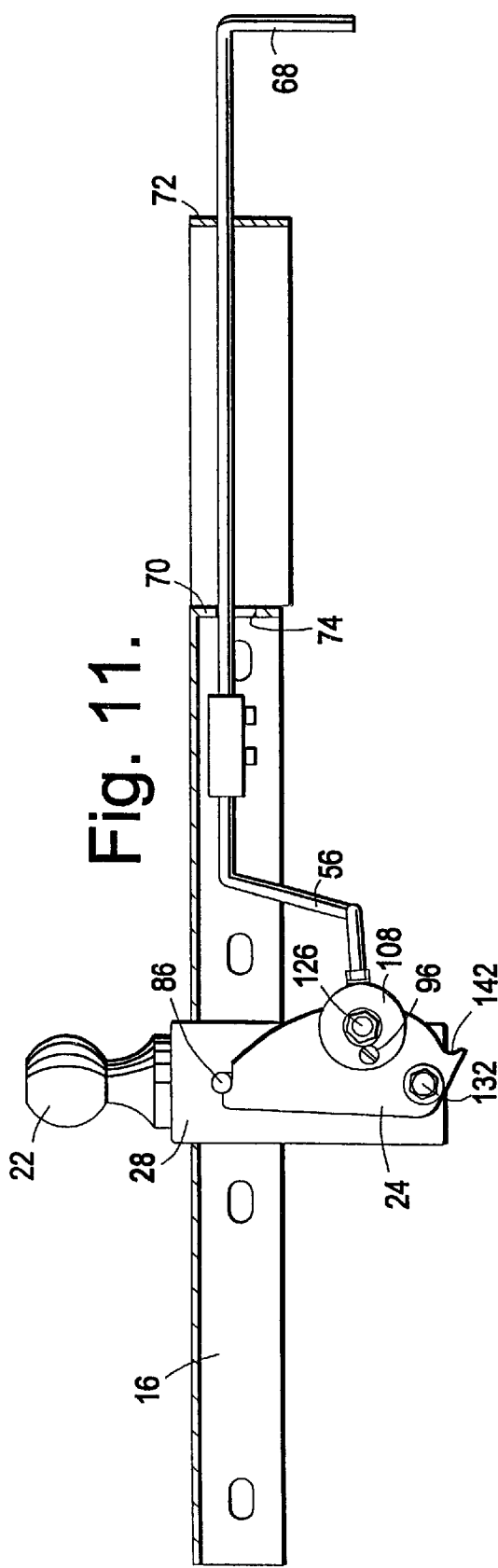

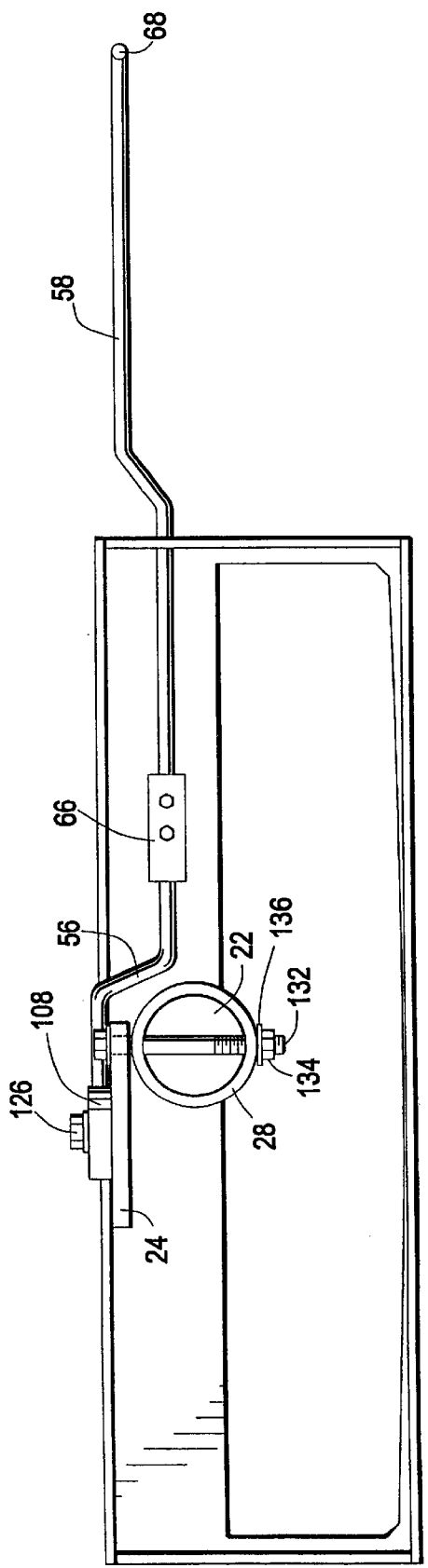
Fig. 14.
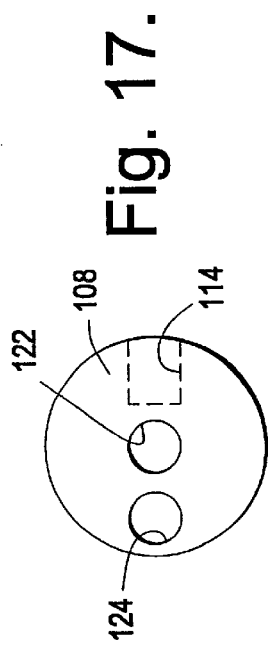
Fig. 17.
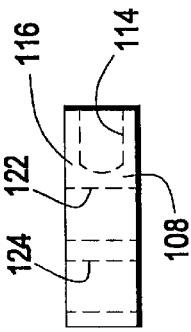
Fig. 18.
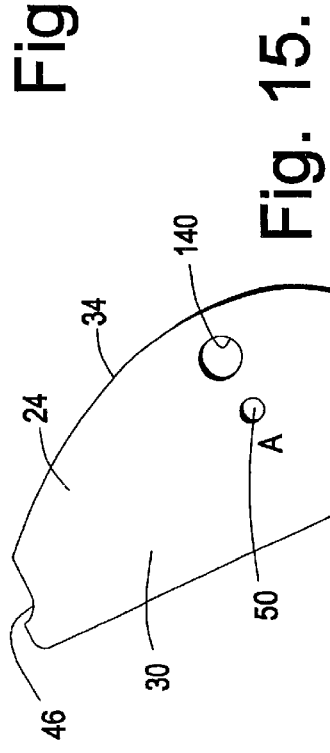
Fig. 15.
Fig. 16.

MECHANISM FOR RETRACTABLE GOOSENECK HITCH BALL

CROSS-REFERENCE TO RELATED APPLICATIONS

This application claims priority from U.S. Prov. Application Ser. No. 60/118,935, filed Feb. 5, 1999, entitled Mechanism for Retractable Goose Neck Hitch Ball.

STATEMENT REGARDING FEDERALLY SPONSORED RESEARCH OR DEVELOPMENT

Not Applicable.

BACKGROUND OF THE INVENTION

The present invention relates to "gooseneck" type trailer hitches for use in the bed of a pickup truck. More particularly, this invention relates to a gooseneck trailer hitch mechanism which allows a user to lower the hitch ball below the floor of a truck bed for storage when the hitch ball is not in use, thereby permitting the user to make full use of the bed of the truck.

A common method of attaching larger trailers to a pickup truck for towing is the use of a "gooseneck" or fifth wheel trailer hitch. Unlike the most common method of hooking a trailer to a vehicle for towing where a ball is mounted on the bumper of a truck, in a gooseneck trailer hitch arrangement, the ball is mounted on the floor of a pickup bed and/or to the truck frame below the bed floor generally over the rear axle of the truck. In this arrangement, the trailer has a long tongue portion which is curved and takes on the general shape of a goose's neck. A benefit of having the hitch ball mounted directly over the trailer, as opposed to mounted on the bumper, is that the amount of load placed on the tongue oft he trailer can be increased as the load is passed directly onto the rear axle of the truck instead of onto the bumper.

While gooseneck hitches of this type have been around for years, a problem associated with this hitching arrangement is the location of the upwardly and typically permanently mounted hitch ball in the middle of the floor of the bed. In the majority of the gooseneck hitch arrangements, the hitch ball is coupled with a large metal plate and the entire unit is bolted or welded to the floor of the truck bed and/or to the truck frame below the bed floor in a location which is generally equidistant from the side walls of the bed and in the center of the bed. This type of arrangement presents problems in that if a user of a truck desires to lay large, flat sheet goods in the bed of the truck, the upwardly protruding hitch member does not allow the sheet goods to lay flat on the bed of the truck and can thereby damage the sheet goods. Similarly, if the user of the truck fills the bed with loose materials, such as dirt or gravel and attempts to shovel the loose material out, the upwardly protruding hitch member often interferes with the user's ability to shovel the loose material out of the bed.

In an effort to solve these problems, several people have devised arrangements where the hitch ball is either completely removable or may be lowered beneath the floor of the bed. Most of these arrangements have several shortcomings. For example, many of the arrangements require the user to get up in the bed of the truck and manually remove the hitch member by pulling it out of the floor of the bed. The user must then climb back out of the bed and store the hitch ball somewhere until its next use.

Therefore, there is a need for a retractable gooseneck trailer hitch mechanism which may be operated from a location remote from the hitch ball and the interior of the bed of the pickup truck. The present invention overcomes the drawbacks of the prior art and fills these and other needs.

BRIEF SUMMARY OF THE INVENTION

In order to overcome the above-stated problems and limitations, and to achieve the noted advantages, there is provided a retractable gooseneck trailer hitch mechanism having a housing with a generally vertical opening therein, a hitch member which is slidably received in the housing and movable between a raised and lowered position, a cam coupled with the housing which contacts a portion of the hitch member and a linkage assembly coupled with the cam which permits a user to move the cam and in turn raise and lower the hitch member.

In general, the housing includes a generally vertical slot therein and a portion of the hitch member extends through the slot outside of the housing. The cam is pivotal between a first position and a second position about a shaft which extends from the housing and has an arcuate face which contacts the portion of the hitch member which extends through the slot in the housing. As the cam is moved from the first position to the second position by the user via the linkage assembly, the portion of the hitch member which is in contact with the arcuate face of the cam rids along the arcuate face of the cam and in turn travels upwardly in the generally vertical slot in the housing. In turn, the hitch member rises upwardly in the opening and is moved from the lowered or retracted position to the raised or extended use position. The user may selectively move the hitch member between its raised and lowered position.

Further features and advantages of the present invention over the prior art will become apparent from the detailed description oft he drawings which follows, when considered with the attached figures.

BRIEF DESCRIPTION OF THE SEVERAL VIEWS OF THE DRAWING

The features oft he invention noted above are explained in more detail with reference to the embodiments illustrated in the attached drawing figures, in which like reference numerals denote like elements, and in which:

FIG. 2 is a front elevational view of the first embodiment of the mechanism of the present invention with the hitch member in the lowered position;

FIG. 3 is a front elevational view of the first embodiment of the mechanism of the present invention with the hitch member in a raised position;

FIG. 4 is a partial cut-away front elevational view of the housing, the hitch member and the cam of the first embodiment of the mechanism with the hitch member in the raised position;

FIG. 5 is a partial cut-away front elevational view of the housing, the hitch member and the cam of the first embodiment of the mechanism with the hitch member in the lowered position;

FIG. 10 is a front elevational view of a second embodiment of the mechanism of the present invention with the hitch member in the lowered position;

FIG. 11 is a front elevational view of the second embodiment of the mechanism with the hitch member in the raised position;

FIG. 14 is a bottom plan view of the second embodiment of the mechanism of the present invention with the hitch member in the lowered position;

FIG. 15 is a side view of the cam of the second embodiment;

FIG. 16 is a bottom plan view of the cam of FIG. 15;

FIG. 17 is a side view of the hub of the second embodiment;

FIG. 18 is a plan view of the hub of FIG. 17; and

DETAILED DESCRIPTION OF THE INVENTION

Figure 1:
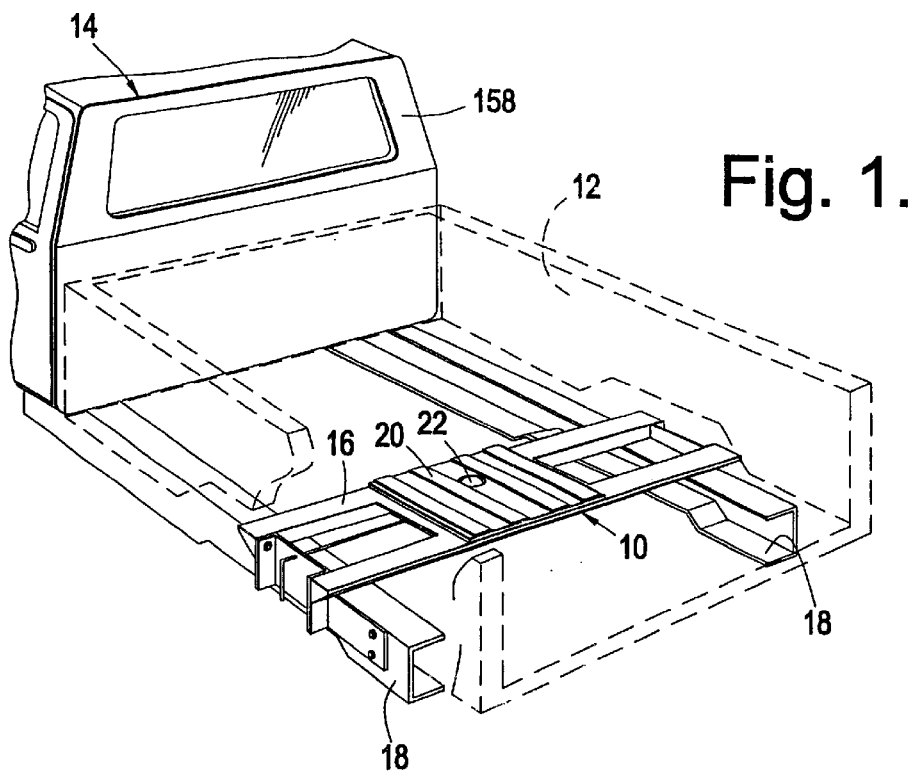
FIG. 1 is a perspective view of a retractable gooseneck hitch ball mechanism constructed in accordance with a second embodiment of the present invention mounted for use in a bed of a pickup truck with the hitch member of the mechanism in a retracted or lowered position.

Referring now to the drawings in detail, and initially to FIG. 1, numeral 10 generally designates a retractable gooseneck hitch ball mechanism constructed in accordance with the present invention. The mechanism 10 is designed to be mounted in a bed 12 of a pickup truck 14. The mechanism includes a frame 16 which is attached to a vehicle frame 18. The bed of the truck includes a floor 20 and the mechanism includes a retractable hitch member 22. When the mechanism is mounted in the bed of the truck, the mechanism is designed so that the top of the hitch member 22 is located just below the floor 20 of the bed when the hitch member is in a lowered position as depicted in FIG. 1.

Looking now at FIG. 2 which illustrates a first embodiment of the present invention with the hitch member 22 in the lowered position, the mechanism 10 preferably includes a cam 24, a linkage assembly 26, the hitch member 22, and a housing 28.

The cam 24 is preferably a plate-like member and may be cut out of a solid sheet of metal. The cam has a front side 30, a rear side 32, an arcuate edge 34 and a rear edge 36. The arcuate edge 34, when the cam is rotated, facilitates the movement of the hitch member 22 from the lowered position illustrated in FIG. 2 to a raised position illustrated in FIG. 3, as will be discussed in greater detail below. The cam 24 also has a proximal end 38 and a distal end 40. Near the proximal end 38, the cam includes a bore 42. The bore 42 receives a shaft 44 that extends from the housing 28 and upon which the cam 24 pivots. At the distal end 40 of the cam, the arcuate edge 34 includes a landing 46. The landing provides a seat upon which a portion of the hitch member 22 rests when the hitch member is in the raised position.

While the landing 46 may have a flat portion, the landing preferably has a convex portion 47 located adjacent the arcuate edge 34. Although the convex portion 47 appears to be generally flat in the illustrations, the convex portion is actually convex in nature and generally bowed outwardly. The amount the convex portion bows outwardly is determined by the distance the convex portion 47 of the landing 46 is from the center of the bore 42. The convex portion 47 is preferably a segment of a circumference of a circle or an arc having a radius with a center point at the center of the bore 42 and an end point where the landing and the arcuate edge 34 meet. By having the landing include the convex portion 47, regardless of precisely where the portion of the hitch member 22 rests on the convex portion 47 of the landing 46 of the cam when the hitch member is in the raised position, downward pressure placed on the hitch member during use will be transferred to the center of the pivot point of the cam (i.e. to the center of the bore 42) and will not cause the cam to try to rotate.

The rear edge 36 of the cam, which is opposite the arcuate edge 34, has a wing 48. On the rear side 32 oft he cam 24, the wing 48 has an indentation 50. The wing and the indentation work together with a portion of the housing 18 as a first latching mechanism to maintain the hitch member 22 in the raised position, as will be discussed in greater detail below.

The linkage assembly 26 has a cam end 52 and a user engageable end 54 and permits a user of the mechanism 10 to move the cam 24 from a first or generally horizontal position as illustrated in FIG. 2, wherein the hitch member is in the lowered position, to a second or generally vertical position as illustrated in FIG. 3, wherein the hitch member is in the raised position, from a location remotely located from the hitch member 22. While the linkage assembly could certainly be comprised of a single elongate member, for ease of installation, the linkage assembly 26 preferably includes an arm 56 and a rod 58. The arm has a first end 60, which is the same as the cam end 52 of the linkage assembly, and a second end 62. The first end 60 of the arm is coupled with the cam 24 in a pivotal manner so that when the linkage assembly is activated, the cam rotates about the shaft 44. The second end 62 of the arm 56 is preferably coupled with a first end 64 of the rod 58. The arm and rod may be coupled with a coupler 66. The rod extends to an exterior user accessible portion of the truck bed 12 and terminates in a handle 68. In the present embodiment, the exterior user accessible portion of the truck bed is located in a rear driver's side wheel well. This location, however, may be changed depending on the user's preference. The handle 68 is also the user engageable end 54 of the linkage assembly 26.

To support the connected arm and rod combination, the frame 16 of the mechanism preferably includes first and second guide plates 70, 72 having holes 74, 76 respectively, therein, through which a portion of the arm and rod combination passes and is supported during use. Located on the rod 58 just inward from the handle 68 is a spacer 78. The spacer 78 has a length dimension along the rod 58. The spacer works in conjunction with the hole 76 in the second guide plate 72 as a second method of maintaining the cam 24 in the second or generally vertical upright position during use. This process will be described in further detail below.

Figure 6:
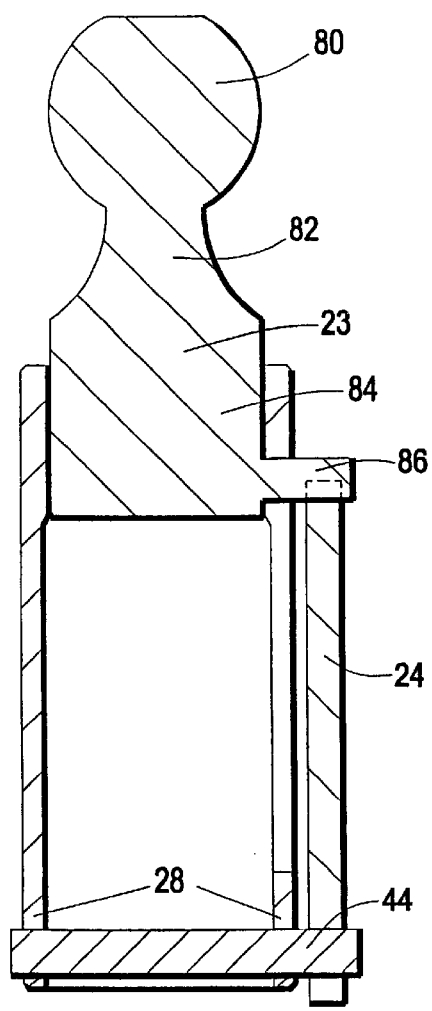
FIG. 6 is a c ross-sectional view taken generally along the line 5—5 of FIG. 4.

The hitch member 22, as best viewed in FIGS. 4, 5 and 6, includes an upper ball section 80, a middle throat section 82, and a lower base section 84. The hitch member also includes a pin 86 which extends outwardly and preferably radially from a lower portion of the base section 84. The pin 86 is preferably cylindrical in shape. The hitch member 22 is received in a generally vertical opening 88 in the housing 18 and is movable therein from a first or lowered position (FIG. 5) to a second or raised position (FIG. 4).

The housing 28 generally has a body 90 that is preferably tubular in shape. The body 90 has the opening 88 therein which is defined by a wall 92 of the housing. The wall 92 includes a generally vertical slot 94 in which the pin 86 travels during use. The housing 18 also includes the shaft 44 upon which the cam 24 pivots. While the opening 88 need not pass all the way through the housing 28, it has been found beneficial for the opening to do so. As the mechanism 10 is located in the bed 12 of a pickup truck 14, during use of the truck, debris may be placed in the bed 12. The debris may fall down into the opening 88 in the housing and around the hitch member 22. By having the opening 88 pass all the way through the housing 28, the debris can fall out the bottom of the opening.

Additionally, to facilitate the cleaning out oft he opening and to make it easier for any loose debris to pass through the housing, it has been found beneficial to increase the size of the opening down where the base section 84 of the hitch member 22 rests when the hitch member is in the lowered position. By making the size (or diameter, if both the opening and base section are cylindrical as illustrated) of the opening larger towards the bottom oft he opening, a space is opened up around the hitch member and between the hitch member and the interior of the wall 92 where the debris may pass through. By having a close tolerance between the base section 84 of the hitch member and the top portion of the opening, the hitch member is more secure and less likely to move laterally during use when the hitch member is in the raised position.

In the first embodiment, the housing 28 also preferably includes a cam latch 96 which cooperates with the indentation 50 on the wing 48 of the cam 24 as the first latching mechanism to maintain the cam in the generally vertical position during use of the mechanism. The cam latch 96 has a plunger 98 which is biased outwardly by a spring 100. The plunger and spring are contained within a casing 102.

In use, the hitch member 22 starts in the first or lowered position and the cam is in the first or horizontal position illustrated in FIGS. 2 and 5. To extend or raise the hitch member 22 for use, the user grabs the handle 68 and pulls outwardly (to the right in FIG. 2). By pulling outwardly on the user engageable end 54 of the linkage assembly, the linkage assembly, which is connected to the cam 24 at the cam end 52, causes the cam to pivot about the shaft 44. As the cam pivots about the shaft and is brought to the second or generally vertical and upright position as depicted in FIGS. 3 and 4, the arcuate edge 34 of the cam pushes upwardly on the bottom side of the pin 86 of the hitch member 22. As the cam 24 continues to move to the generally vertical position, the pin 86 slides along the arcuate edge 34 of the cam, thus raising the hitch member to the raised, extended and/or use position shown in FIGS. 3 and 4. When the cam is in an upright position, the pin 86 slides into and becomes seated in the landing 46 in the edge of the cam. The cam thereby supports the hitch member in the extended and use position.

To prevent the cam from accidentally falling down to the generally horizontal first position shown in FIG. 4 during use, the two latching mechanisms have been devised. The first latching mechanism is the cam latch 74. When the cam is moved to the upright position, the plunger 98 engages with the indentation 50 on the rear side 32 of the cam 24. In order to return the cam to the generally horizontal position and thereby retract the hitch member 22, the user must push on the handle 68 with an inward force sufficient enough to push the plunger 98 back into the casing 102 and compress the spring 100.

Figure 7:
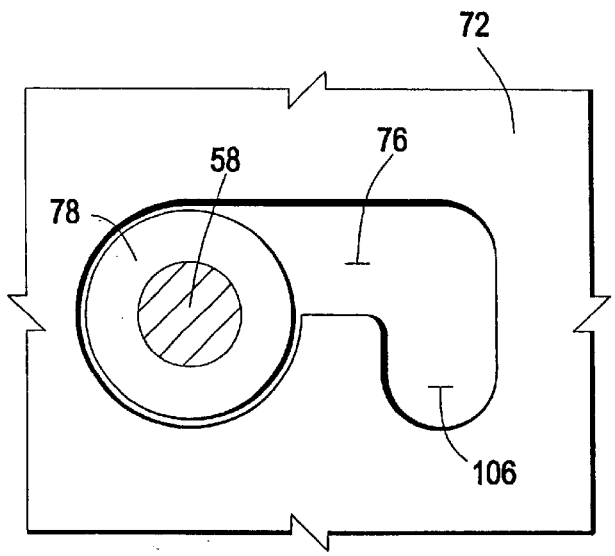
FIG. 7 is a side view of a second latching mechanism of the first embodiment of the mechanism when the hitch member is in the lowered position.
Figure 8:
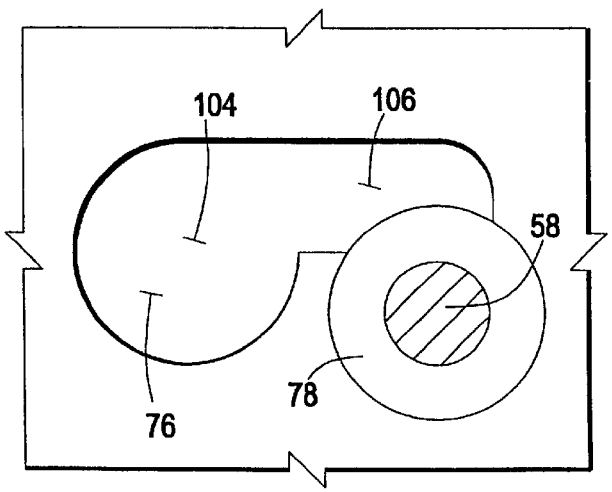
FIG. 8 is a side view of the second latching mechanism of the first embodiment of the mechanism when the hitch member is in the raised position.
Figure 9:
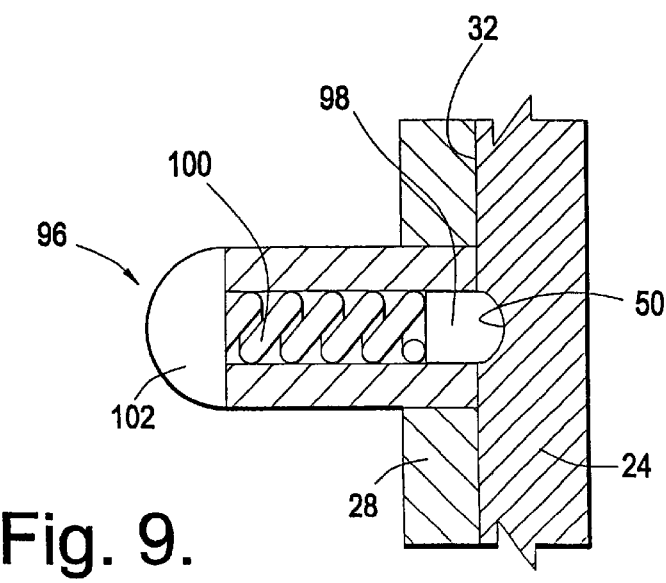
FIG. 9 is a fragmentary cross-sectional side view of a first latching mechanism of the first embodiment of the mechanism illustrating a cam latch engaging an indentation in a cam when the hitch member is in the raised position.

The second latching mechanism is the cooperation of the spacer 78 and the hole 76 in the second guide plate 72. Looking now at FIG. 7, the hole 76 is a generally sideways "g" shaped opening. When the hitch member is in the retracted position, the spacer 78 fits completely through a large portion 104 of the hole 76. However, when the handle 68 is pulled all the way out and the cam is in an upright position, the rod 58 may be moved over to a smaller portion 106 of the hole 76 such that the spacer 78 is larger than the smaller portion 106 oft he hole and thereby prevents the rod from retracting back into the hole, which in turn prevents the cam from returning to the generally horizontal position. (See FIG. 8).

Figure 12:
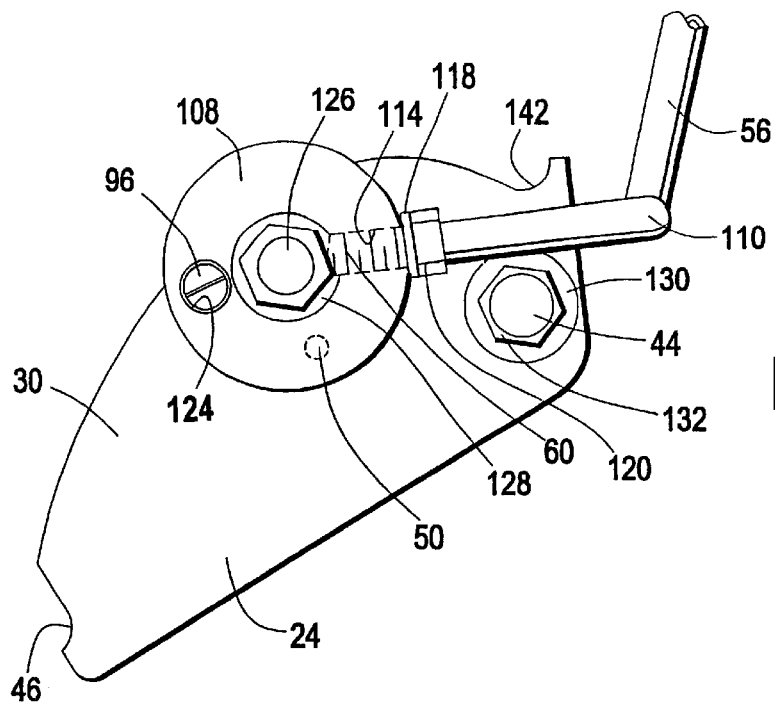
FIG. 12 is a close-up fragmentary front elevational view of the cam and a hub of the second embodiment when the hitch member is in the lowered position.

In a second embodiment, which is depicted in FIGS. 10–18, the method in which the linkage assembly 26 is connected to the cam 24 has been altered. In contrast to the first embodiment where the cam end 52 of the linkage assembly is connected directly to the cam 24, in the second embodiment, and as best depicted in FIG. 12, the cam end 52 is connected to a hub 108. The hub 108 is, in turn, connected to the cam 24.

In the second embodiment, the arm 56 preferably includes a bend 110 near the first end 60. The first end 60 includes a threaded portion 112 which is threadably received in a side bore engaged in a side 116 of the hub 108. To make sure the threaded portion of the arm remains engaged in the side bore of the hub, there is provided a washer 118 and a nut 120 on the arm. It should be noted that the first end 60 of the arm 56 need not be threadably coupled with the hub. Alternatively, for example, the first end of the arm could simply be received in the side bore 114 and welded in place.

Looking now at the hub 108, and with reference specifically to FIG. 17, the hub may be generally circular in shape and contains a first bore 122 and a second bore 124. The first through bore is preferably located at the center oft he hub such that the hub takes on the appearance of a thick washer. The second bore 124 is located outwardly from a center point of the hub and opposite the side bore 114. All three bores 114, 122, 124 are preferably arranged such that the central axes of all three bores lie in the same plane. The hub 108 is preferably pivotally mounted to the cam 24 by a bolt 126 through the first bore 122. The hub 108 may then rotate about the bolt 126.

In the second embodiment, the cam latch 96 is moved from the housing 28 to the hub 108. The cam latch 96 is threadably received in the second through bore 124 of the hub. Accordingly, in the second embodiment, the indentation 50, with which the plunger 98 cooperates, must be moved to the front side 30 of the cam 24 from its location on the rear side 32 in the first embodiment. Additionally, in the second embodiment, the wing 48 can be omitted.

FIG. 12 illustrates the hub and cam combination when the hitch member 22 is in the lowered position. It should be noted that in this position, the cam latch 96 is not engaged with the indentation 50. This is also illustrated in FIG. 10. As the user pulls the handle 68 in FIG. 10 away from the hitch member 22, as in the first embodiment, the cam 24 is moved to an upright position, as pictured in FIG. 11. In the second embodiment, however, the hub 108 rotates about the bolt 126 such that the cam latch 96 in the hub aligns with the indentation 50 in the front side 30 of the cam 24 when the hitch member is in the upright and use position as pictured in FIG. 11. While not illustrated in FIGS. 10, 11, and 14, the second latching mechanism illustrated in FIGS. 7 and 8 and discussed above may also be used with the second embodiment.

Figure 13:
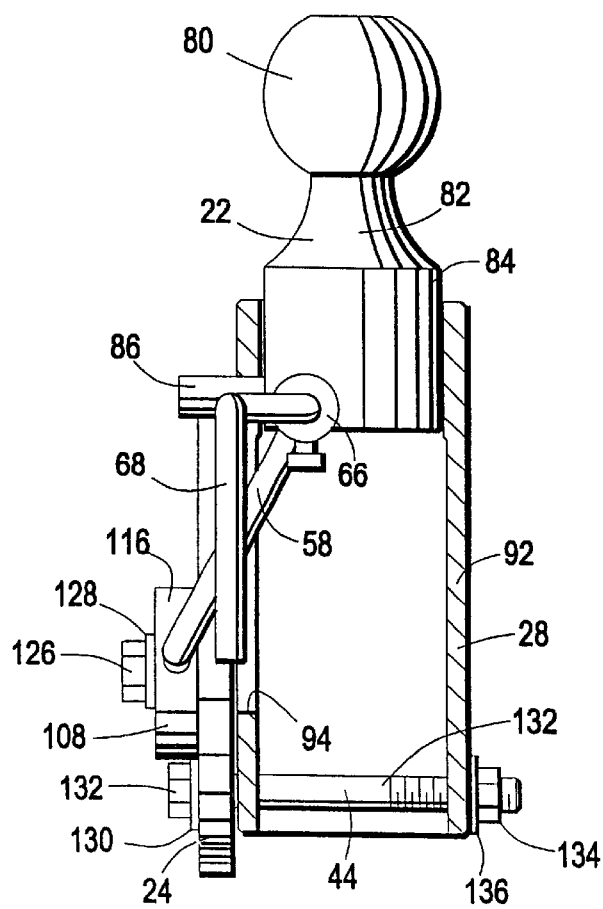
FIG. 13 is a right side view of the second embodiment of the present invention with the hitch member in the raised position and a portion of the housing cut away for clarity.

Some other alterations which are within the scope of the present invention include the addition of a washer 128 between the bolt 126 and the hub 108 and a washer 130 on the shaft 44. Likewise, while the shaft 44 was illustrated as a rod-like member in the first embodiment, the shaft 44 may comprise a bolt 132 having a nut 134 and a washer 136 on an end 138 oft he bolt on the side of the housing 28 opposite the cam 24, as best illustrated in FIG. 13. Further, it should be understood that the cam 24 of the second embodiment contains a second bore 140 which receives the bolt 126 that attaches the hub to the cam. Additionally, the cam 24 of the second embodiment includes a seat 142 at the proximal end 38 oft he cam which is comparable to the landing 46. When the hitch member 22 is in the lowered position, the pin 86 is seated in the seat 142, as best illustrated in FIG. 10.

Figure 19:
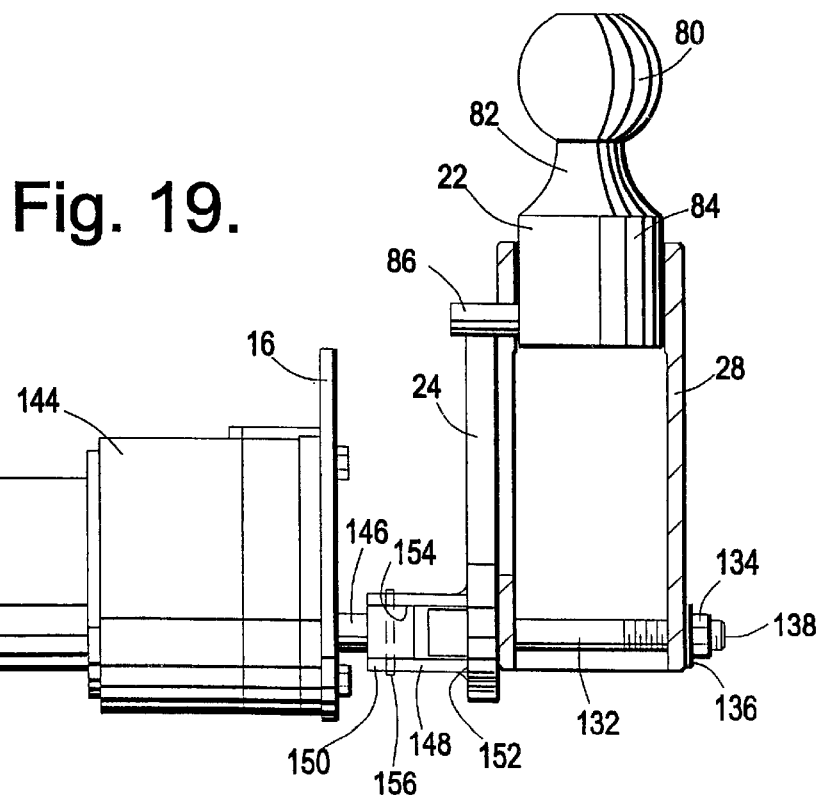
FIG. 19 is a side view of a third embodiment of the mechanism of the present invention with the hitch member in the raised position and a portion of the housing cut away for clarity.

A third embodiment of a retractable gooseneck trailer hitch mechanism is depicted in FIG. 19. In this embodiment, the manually operated linkage assembly 26 is replaced by a motor 144. The motor 144 includes a drive shaft 146 which extends therefrom and is coupled with the cam 24 via a drive coupler 148. The drive coupler has a motor end 150 and a cam end 152. The motor end of the drive coupler may include a recess 154 for receiving a portion oft he drive shaft 146. The drive shaft may then be coupled with the motor coupler via a locking pin 156. The motor 144 and the housing 28 may be mounted to the mechanism frame 16 so that when the motor 144 is activated, the drive shaft 146 of the motor selectively rotates the cam 24 between its first and second positions to selectively raise and lower the hitch member 22. The motor 144 may be an electric motor and preferably includes a switch (not pictured) located remotely from the motor 144. Preferably, the switch is located in a cab 158 of the truck 14 so that the user may raise and lower the hitch member from within the cab of the truck. Preferably, and as illustrated in FIG. 19, the drive shaft 146 has a longitudinal axis which is co-axial with a longitudinal axis of the shaft 44 or the bolt 132 about which the cam 24 rotates.

At this point, it should be noted that the specific embodiments illustrated and described herein are but only three of many ways to achieve the present invention. Slight modifications in the invention may be made without departing from the scope of the invention. For example, the linkage assembly 26, instead of being a solid rod which is pushed and pulled by the user, may be replaced by a cable, or the electric motor 14 may be replaced by an electric solenoid, a hydraulic device, an air pressure device, a vacuum device, or by any combination of these methods which would facilitate the movement of the cam from a first generally horizontal position to a second generally vertical position. Similarly, the cam need not be on the side of the hitch member but need only contact a portion of the hitch member to effectuate the hitch member's movement from the first to the second position.

Likewise, while the cam latch 96 is illustrated as a casing 102 having an outwardly biased plunger 98 that is received in the indentation 50, the cam latch 96 may be replaced by any item which would engage the cam 24 to hold it in the upright position. For example, the indentation could be replaced with a through bore and the spring could be replaced by a cable running to a location near the handle where the user may selectively move the plunger into engagement with the through bore in the cam to act as a more positive locking arrangement whereby the cam cannot return to the down position without the user purposefully removing the plunger from the through bore.

From the foregoing it will be seen that this invention is one well adapted to attain all ends and objectives hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A retractable gooseneck trailer hitch mechanism comprising: a housing;

a hitch member which is slidably received within the housing and movable therein between a first position and a second position;

a cam engaging at least a portion of the hitch member and pivotal between first and second positions; and a linkage assembly attached to the cam wherein activation of the linkage assembly selectively moves the hitch member between the first and second positions via the cam.

2. The mechanism of claim 1, wherein the housing is generally tubular in shape and arranged in a generally vertical orientation.

3. The mechanism of claim 2, wherein the housing has a wall and wherein a portion of the wall has a generally vertical slot there through.

4. The mechanism of claim 3, wherein the hitch member includes a pin which extends outwardly therefrom, the pin being slidably received in the slot and a portion of the pin projecting outwardly beyond the wall of the housing.

5. The mechanism of claim 4, wherein the cam includes an arcuate edge in sliding contact with the portion of the pin which projects outwardly beyond the wall of the housing, whereby the pin slides along the arcuate edge of the cam as well as along the generally vertical slot in the wall of the housing and the hitch member moves between its first and second positions when the cam is pivoted between its first position and second positions.

6. The mechanism of claim 1, wherein the cam has a front side, a rear side, an arcuate edge, a rear edge, a proximal end and a distal end and wherein the cam slidably engages the portion of the hitch member on the arcuate edge.

7. The mechanism of claim 6, wherein the cam further includes a landing in the arcuate edge at the distal end of the cam.

8. The mechanism of claim 7, wherein the housing further includes a cam latch.

9. The mechanism of claim 8, wherein the cam latch includes a casing having a spring therein and a plunger, the spring biasing the plunger outwardly, and wherein the cam includes an indentation on the rear side thereof, the plunger and the indentation cooperating when the hitch member is in its second position to maintain the hitch member in its second position.

10. The mechanism of claim 1, wherein the housing includes a shaft which extends therefrom and wherein the cam includes a bore, the bore receiving the shaft whereby the cam is supported by and rotatable on the shaft.

11. The mechanism of claim 1, wherein the hitch member has a ball section, a throat section, and a base section, the throat section being located intermediate the ball section and the base section, wherein the hitch member is received in the housing in an opening in the housing, and wherein the base section has a cross-section whose shape corresponds to a cross-section of the opening.

12. The mechanism of claim 11, wherein the cross-sections oft he base section and the opening are round and wherein the base section has an outer dimension that is slightly smaller than an inner dimension of the opening.

13. The mechanism of claim 1, wherein the linkage assembly has a cam end that is coupled with the cam and a user engagable end, the user engagable end having a handle.

14. The mechanism of claim 13, further comprising a frame supporting the housing and having an exterior plate with an opening therein, the opening having a large portion and a smaller portion, and wherein the linkage assembly includes a spacer adjacent the opening, the spacer having an outer dimension smaller than the large portion of the opening and larger than the smaller portion of the opening, whereby the spacer may pass through the large portion of the opening and may not pass through the smaller portion of the opening.

15. A retractable gooseneck trailer hitch mechanism for use in the bed of a pickup truck, the mechanism comprising:
   a frame;
   a housing connected to the frame, the housing being generally tubular in shape and defining a generally vertical opening therein;
   a hitch member slidably received in the opening in the housing and movable between a raised position and a lowered position;
   a cam having an arcuate edge, wherein the cam slidably engages a portion of the hitch member on the arcuate edge, wherein the cam is pivotable between a first position and a second position, wherein the hitch member is in the lowered position when the cam is in the first position, wherein the hitch member is in the raised position when the cam is in the second position, and wherein movement of the cam between its first and second positions moves the hitch member between its lowered and raised positions respectively; and
   a linkage assembly having a cam end an a user engageable end, wherein the cam end is connected to the cam, wherein the user engageable end is spaced apart from the hitch member and whereby a user may selectively move the cam between its first and second positions via the linkage assembly.

16. The mechanism of claim 15, wherein the housing has a shaft extending therefrom and a wall with a generally vertical slot there through, wherein the hitch member has a pin which extends therefrom and is slidably received in the slot oft he housing, wherein the cam includes a bore which receives the shaft, and wherein the pin is the portion of the hitch member that is slidably engaged on the arcuate edge of the cam.

17. The mechanism of claim 16, wherein both the slot and the pin have a width dimension, the width dimension oft he pin being slightly less than the width dimension oft he slot, and wherein both the opening and the hitch member have a width dimension, the width dimension of the hitch member being slightly less than the width dimension of the opening.

18. The mechanism of claim 16, wherein the pin and the shaft are generally parallel to each other, wherein the pin, the shaft and the slot each have a longitudinal axis, and wherein each of their longitudinal axises lie in a common plane.

19. The mechanism of claim 18, wherein the opening in the housing is cylindrical in shape and has a central longitudinal axis, wherein the hitch member has a base section with a circular cross-section and a central longitudinal axis that is coaxial with the central longitudinal axis of the opening, wherein the longitudinal axis of the shaft is generally perpendicular to the central longitudinal axis of the opening, and wherein the longitudinal axis of the pin is generally perpendicular to the central longitudinal axis of the hitch member.

20. A retractable gooseneck trailer hitch mechanism comprising:
   a housing having an opening therein;
   a hitch member slidably received in the opening and movable between a raised position and a lowered position;
   a cam coupled with the housing and slidably engaging a portion of the hitch member;
   a hub coupled with the cam; and
   a linkage assembly coupled with the hub to facilitate moving the hitch member between the raised and lowered positions.

21. The mechanism of claim 20, wherein the cam has a bore and an arcuate face, the cam slidably engaging the portion of the hitch member on the arcuate face, and wherein the housing has a shaft, the bore in the cam receiving the shaft of the housing in a manner which permits the cam to rotate about the shaft.

22. The mechanism of claim 21, wherein hub has an outer face, an inner face, a side, a first bore in the inner face and a side bore in the side, wherein the cam has a second bore, wherein the hitch member further includes a bolt, the bolt coupling the cam and the hub and being received in the first bore of the hub and the second bore of the cam, and wherein the linkage assembly has a hub end, the hub end being received in the side bore of the hub.

23. The mechanism of claim 22, wherein the cam has a front side with an indentation therein, wherein the hub has a second bore that receives a cam latch, and wherein the cam latch cooperates with the indentation in the cam when the hitch member is in the raised position to maintain the hitch member in the raised position.

24. The mechanism of claim 20, wherein housing has a wall that defines the opening in the housing, the wall having a slot there through, wherein the hitch member has a pin that extends outward from the hitch member and is slidably received in the slot, wherein the cam has an arcuate edge, wherein the arcuate edge of the cam slidably engages the pin of the hitch member.

25. The mechanism of claim 24, wherein the cam has a first position and a second position, the cam being in the first position when the hitch member is in its raised position and the cam being in the second position when the hitch member is in its lowered position, and wherein activation of the linkage assembly rotates the cam between its first and second positions via the hub which in turn moves the hitch member between its raised and lowered positions via the pin sliding on the arcuate edge of the hitch member.

26. The mechanism of claim 24, wherein the cam has a proximal end and a distal end, and wherein the arcuate edge has a landing at the distal end and a seat at the proximal end.

27. A retractable gooseneck trailer hitch mechanism comprising:
- a housing having an opening therein;
- a hitch member slidably received in the opening and movable between a raised position and a lowered position;
- a cam pivotally coupled with the housing and slidably engaging a portion of the hitch member, wherein the cam is rotatable between first and second positions;
- a motor coupled with the cam and facilitating rotation thereof; and
- a switch coupled with the motor for selectively activating the motor.

28. The mechanism of claim 27, further comprising a motor coupler having a motor end and a cam end, wherein the motor includes a drive shaft having a longitudinal axis, the drive shaft being coupled with the motor end of the motor coupler, and wherein the cam end of the motor coupler is coupled with the cam.

29. The mechanism of claim 28, wherein the housing includes a shaft having a longitudinal axis, wherein the cam includes a bore, the cam receiving the shaft in the bore and being rotatable thereon, and wherein the longitudinal axis of the drive shaft and the longitudinal axis of the shaft are coaxial.

* * * * *

UNITED STATES PATENT AND TRADEMARK OFFICE
CERTIFICATE OF CORRECTION

PATENT NO. : 6,447,000 B1
APPLICATION NO. : 09/496078
DATED : September 10, 2002
INVENTOR(S) : Dick et al.

It is certified that error appears in the above-identified patent and that said Letters Patent is hereby corrected as shown below:

Column 1, lines 34-35 - Change "oft he" after "tongue" to --of the--;
Column 2, line 34 - Change "oft he" after "description" to --of the--;
Column 2, line 39 - Change "oft he" after "features" to --of the--;
Column 4, line 23 - Change "oft he" after "side 32" to --of the--;
Column 5, line 21 - Change "oft he" after "out" to --of the--;
Column 5, line 28 - Change "oft he" after "bottom" to --of the--;
Column 6, line 17 - Change "oft he" after "portion 106" to --of the--;
Column 6, line 43 - Change "oft he" after "center" to --of the--;
Column 7, line 14 - Change "oft he" after "end 138" to --of the--;
Column 7, line 20 - Change "oft he" after "38" to --of the--;
Column 7, line 30 - Change "oft he" after "portion" to --of the--;
Claim 12, Column 9, line 13 - Change "oft he" after "sections" to --of the--;
Claim 16, Column 9, line 58 - Change "oft he" after "slot" to --of the--;
Claim 17, Column 9, line 63 - Change "oft he" after "dimension" to --of the--; and
Claim 17, Column 9, line 64 - Change "oft he" after "dimension" to --of the--.

Signed and Sealed this

Twenty-fifth Day of December, 2007

JON W. DUDAS
*Director of the United States Patent and Trademark Office*